US009311615B2

(12) United States Patent
Davenport et al.

(10) Patent No.: US 9,311,615 B2
(45) Date of Patent: Apr. 12, 2016

(54) INFRASTRUCTURE ASSET MANAGEMENT

(75) Inventors: Andrew J. Davenport, Brooklyn, NY (US); Wei Shan Dong, Beijing (CN); Frank D. Fenhagen, IV, Baltimore, MD (US); Arun Hampapur, Norwalk, CT (US); Zhong Bo Jiang, Beijing (CN); Jayant R. Kalagnanam, Tarrytown, NY (US); Hongfei Li, Yorktown Heights, NY (US); Shilpa N. Mahatma, Mohegan Lake, NY (US); Wei Sun, Beijing (CN); Lexing Xie, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 12/983,556

(22) Filed: Jan. 3, 2011

(65) Prior Publication Data

US 2012/0173300 A1   Jul. 5, 2012

(51) Int. Cl.
*G06Q 10/00* (2012.01)
*G06Q 10/06* (2012.01)
*G06Q 99/00* (2006.01)

(52) U.S. Cl.
CPC .......... *G06Q 10/0631* (2013.01); *G06Q 10/063* (2013.01); *G06Q 10/0635* (2013.01); *G06Q 10/20* (2013.01); *G06Q 99/00* (2013.01)

(58) Field of Classification Search
CPC ... G06Q 10/06; G06Q 10/0635; G06Q 20/20; G06Q 10/20; G06Q 10/063; G06Q 10/0631; G06Q 99/00
USPC ......................................... 705/7.28; 702/184
See application file for complete search history.

(56) References Cited

U.S. PATENT DOCUMENTS

| 4,827,394 A | 5/1989 | Wanner |
| 5,615,341 A | 3/1997 | Agrawal et al. |
| 6,026,348 A | 2/2000 | Hala |
| 6,192,325 B1 | 2/2001 | Piety et al. |
| 6,226,634 B1 | 5/2001 | Ogihara et al. |
| 6,324,533 B1 | 11/2001 | Agrawal et al. |
| 6,385,608 B1 | 5/2002 | Mitsuishi et al. |
| 6,393,387 B1 | 5/2002 | Adriaans et al. |
| 6,496,814 B1 | 12/2002 | Busche |

(Continued)

OTHER PUBLICATIONS

A crystal ball for maintenance. David Cullen. Fleet Owner. Overland Park: Oct. 2005. vol. 100, Iss. 10; p. 168, 4 pgs.*

(Continued)

*Primary Examiner* — Timothy Padot
(74) *Attorney, Agent, or Firm* — John R. Pivnichny; Maxine L. Barasch; Keohane & D'Alessandro PLLC

(57) ABSTRACT

An approach for infrastructure asset management is provided. This approach comprises an end-to-end analytics driven maintenance approach that can take data about physical assets and additional external data, and apply advanced analytics to the data to generate business insight, foresight and planning information. Specifically, this approach uses a maintenance analysis tool, which is configured to: receive data about a set of physical assets of an infrastructure, and analyze the data about the set of physical assets to predict maintenance requirements for each of the set of physical assets. The maintenance analysis tool further comprises an output component configured to generate a maintenance plan based on the predicted maintenance requirements for each of the set of physical assets.

20 Claims, 4 Drawing Sheets

(56) References Cited

U.S. PATENT DOCUMENTS

| | | | |
|---|---|---|---|
| 6,581,045 B1* | 6/2003 | Watson | G06Q 30/0283 705/400 |
| 6,925,418 B2 | 8/2005 | Fujiyama et al. | |
| 6,952,680 B1 | 10/2005 | Melby et al. | |
| 7,135,956 B2 | 11/2006 | Bartone et al. | |
| 7,152,035 B1 | 12/2006 | Suhy, Jr. | |
| 7,219,067 B1 | 5/2007 | McMullen et al. | |
| 7,479,875 B2 | 1/2009 | Fehling et al. | |
| 7,480,640 B1 | 1/2009 | Elad et al. | |
| 7,580,912 B2 | 8/2009 | Carlbom | |
| 7,613,804 B2 | 11/2009 | Raden et al. | |
| 7,716,077 B1 | 5/2010 | Mikurak | |
| 7,746,794 B2 | 6/2010 | Sink | |
| 7,945,524 B2 | 5/2011 | Anderson et al. | |
| 2002/0038307 A1 | 3/2002 | Obradovic et al. | |
| 2002/0042687 A1 | 4/2002 | Tracy et al. | |
| 2002/0065698 A1* | 5/2002 | Schick | B61L 27/0094 705/7.36 |
| 2002/0069035 A1 | 6/2002 | Tracy et al. | |
| 2002/0087345 A1 | 7/2002 | Bly et al. | |
| 2002/0116157 A1 | 8/2002 | Markle et al. | |
| 2002/0143421 A1* | 10/2002 | Wetzer | G06Q 10/06 700/100 |
| 2003/0004765 A1* | 1/2003 | Wiegand | G06Q 10/06 702/184 |
| 2003/0023466 A1* | 1/2003 | Harper | G06Q 10/06 705/37 |
| 2003/0023612 A1 | 1/2003 | Carlbom et al. | |
| 2003/0154144 A1 | 8/2003 | Pokorny et al. | |
| 2003/0158702 A1 | 8/2003 | Busche et al. | |
| 2005/0027710 A1 | 2/2005 | Ma et al. | |
| 2005/0143956 A1 | 6/2005 | Long et al. | |
| 2005/0149570 A1 | 7/2005 | Sasaki et al. | |
| 2005/0278052 A1 | 12/2005 | Bett et al. | |
| 2006/0106797 A1 | 5/2006 | Srinivasa et al. | |
| 2006/0217993 A1 | 9/2006 | Anderson | |
| 2006/0282362 A1* | 12/2006 | Nasr | G06Q 10/06 705/35 |
| 2007/0124000 A1 | 5/2007 | Moughler et al. | |
| 2007/0142928 A1 | 6/2007 | Moughler et al. | |
| 2007/0174154 A1 | 7/2007 | Roberts et al. | |
| 2007/0198586 A1 | 8/2007 | Hardy et al. | |
| 2007/0203779 A1* | 8/2007 | Tveit | G05B 23/0283 705/7.13 |
| 2007/0225850 A1* | 9/2007 | Kamisuwa | G06Q 10/006 700/108 |
| 2007/0247789 A1* | 10/2007 | Benson | G01D 4/006 361/672 |
| 2008/0061959 A1 | 3/2008 | Breed | |
| 2008/0177613 A1 | 7/2008 | Chan et al. | |
| 2008/0177678 A1 | 7/2008 | Di Martini et al. | |
| 2008/0306799 A1 | 12/2008 | Sopko, III et al. | |
| 2009/0002148 A1 | 1/2009 | Horvitz | |
| 2009/0070338 A1 | 3/2009 | Spitzig et al. | |
| 2009/0112525 A1 | 4/2009 | Adani | |
| 2009/0138238 A1 | 5/2009 | Bakshi et al. | |
| 2009/0187284 A1 | 7/2009 | Kreiss et al. | |
| 2009/0204245 A1 | 8/2009 | Sustaeta et al. | |
| 2009/0271354 A1 | 10/2009 | Kitayama et al. | |
| 2010/0088141 A1 | 4/2010 | Hill | |
| 2010/0152910 A1 | 6/2010 | Taft | |
| 2010/0179704 A1 | 7/2010 | Ozog | |

OTHER PUBLICATIONS

Modelling preventive maintenance for auxiliary components. Salman T Al-Mishari, S M A Suliman. Journal of Quality in Maintenance Engineering. Bradford: 2008. vol. 14, Iss. 2; p. 148.*

Intelligent wireless condition-based maintenance. (Machine Monitoring/Networking) Sensors 19.6 (Jun. 2002): 14(10).*

On-line condition monitoring and diagnostics of power distribution equipment. Choi, Yong-Sung; Yun, Ju-Ho; Kim, Hyang-Kon; Choi, Chung-Seog; Lee, Kyung-Sup. Proceedings of 2008 International Conference on Condition Monitoring and Diagnosis, CMD 2008: 692-695. IEEE Computer Society. (Dec 1, 2007).*

Johnna Ronee Loftis, USPTO Final Office Action, U.S. Appl. No. 12/954,051, Notification Date Mar. 18, 2014, 8 pages.

Johnna Ronee Loftis, USPTO Office Action, U.S. Appl. No. 12/954,051, Notification Date Sep. 24, 2013, 8 pages.

Johnna Ronee Loftis, USPTO Final Office Action, U.S. Appl. No. 12/954,051, Notification Date Apr. 11, 2013, 10 pages.

Johnna Ronee Loftis, USPTO Office Action, U.S. Appl. No. 12/954,051, Mail Date Dec. 19, 2012, 7 pages.

Johnna Ronee Loftis, USPTO Final Office Action, U.S. Appl. No. 12/954,051, Mail Date Jul. 30, 2012, 7 pages.

Johnna Ronee Loftis, USPTO Office Action, U.S. Appl. No. 12/954,051, Mail Date Mar. 29, 2012, 10 pages.

U.S. Appl. No. 12/983,556, Office Action, Aug. 6, 2014, 7 pages.

U.S. Appl. No. 12/954,051, Office Action, Aug. 25, 2014, 4 pages.

Lorena R. Feacher, USPTO Office Action, U.S. Appl. No. 12/984,019, Mail Date Jul. 3, 2012, 38 pages.

Lorena R. Feacher, USPTO Final Office Action, U.S. Appl. No. 12/984,019, Notification Date Jan. 17, 2013, 61 pages.

Lorena R. Feacher, USPTO Office Action, U.S. Appl. No. 12/984,019, Notification Date Oct. 4, 2013, 57 pages.

Terry Martin, "Modeling System Leverages GIS to Assess Critical Assets", Waterworld, Apr. 2005, 2 pages.

Anna C. Gilbert et al., "Domain-Driven Data Synopses for Dynamic Quantiles", IEEE Transactions on Knowledge and Data Engineering, vol. 17, No. 7, Jul. 2005, 12 pages.

Younghee Kim et al., "Mining Association Rules for RFID Data with Concept Hierarchy", ICACT, Feb. 15-18, 2009, pp. 1002-1006.

IBM, "The SmarterCities Leadership Series Smarter Water", Nov. 2010, http://www.ibm.com/smarterplanet/global/files/gb_en_uk_cities_smarterplanet_DC_WASA.pdf, 2 pages.

L.H. Cui et al., "The Webgis Based Jiangsu Oilfield Management System Implemented With a Spatio-Temporal Data Model", Nanjing University, Nanjing, 210093, PRC and Key Laboratory of Regional Climate-Environment Research for Temperate East Asia, Bejing, Jun. 2008, pp. 773-778.

Timothy Padot, USPTO Office Action, U.S. Appl. No. 14/259,528, Notification Date Oct. 21, 2014, 35 pages.

U.S. Appl. No. 12/984,019, Office Action Communication, Jan. 16, 2015, 40 pages.

Loftis, U.S. Appl. No. 12/954,051, Office Action dated Feb. 27, 2015, 5 pages.

Loftis, U.S. Appl. No. 14/536,960, Office Action dated Jun. 4, 2015, 12 pages.

Padot, U.S. Appl. No. 14/259,528, Office Action dated Apr. 20, 2015, 29 pages.

Lorena R. Feacher, USPTO Final Office Action, U.S. Appl. No. 12/984,019, Notification Date May 13, 2014, 75 pages.

Jeremy Mennis et al., "Mining Association Rules in Spatio-Temporal Data: An Analysis of Urban Socioeconomic and Land Cover Change", Transactions in GIS, 2005, vol. 9, Issue 1, pp. 5-17.

Miloucheva et al., Spatio-Temporal Qos Pattern Analysis in large scale Internet environment, Salzburg Research, Austria and Telefonica, Spain, Sep. 16, 2003.

Romer, "Distributed Mining of Spatio-Temporal Event Patterns in Sensor Networks", Euro-American Workshop on Middleware for Sensor Networks 2006, 103-116.

U.S. Appl. No. 12/984,019, Final Office Action dated Aug. 12, 2015, 37 pages.

U.S. Appl. No. 14/259,528, Office Action dated Sep. 2, 2015, 38 pages.

* cited by examiner

INFRASTRUCTURE ASSET MANAGEMENT

CROSS REFERENCE TO RELATED APPLICATIONS

The present application is related in some aspects to commonly owned and co-pending application entitled "A SYSTEM AND METHOD FOR FAILURE ASSOCIATION ANALYSIS," having U.S. patent application Ser. No. 12/984,019, filed on Jan. 4, 2011; and commonly owned and co-pending application entitled "A SYSTEM AND METHOD FOR RISK OPTIMIZED, SPATIALLY SENSITIVE PREVENTIVE MAINTENANCE SCHEDULING FOR ASSET MANAGEMENT," having U.S. patent application Ser. No. 12/954,051, filed on Nov. 24, 2010, the entire contents of which are herein incorporated by reference.

FIELD OF THE INVENTION

The present invention generally relates to infrastructure asset management. Specifically, the present invention provides an approach for an end-to-end analytics driven asset management.

BACKGROUND OF THE INVENTION

Many entities in the Smarter Planet arena run asset intensive businesses, e.g., water and power utilities, transportation operators, hotels, oil and gas companies, power plants, etc. One of the most significant components of their operating cost tends to be maintenance. Current solutions to the problem use a manual approach to managing maintenance operations (e.g., scheduling, preventive maintenance, operating parameter control, etc). This approach, while leveraging human experience, does not fully involve historical and sensor data sources to inform the decision making around these efforts.

SUMMARY OF THE INVENTION

In one approach, there is a method for infrastructure asset management. In this approach, the method comprises: receiving data about a set of physical assets of an infrastructure; analyzing the data about the set of physical assets to predict maintenance requirements for each of the set of physical assets; and generating a maintenance plan based on the analyzing.

In a second approach, there is a system for infrastructure asset management. In this approach, the system comprises at least one processing unit, and memory operably associated with the at least one processing unit. A maintenance analysis tool is storable in memory and executable by the at least one processing unit. The maintenance analysis tool comprises: an analysis component configured to: receive data about a set of physical assets of an infrastructure; and analyze the data about the set of physical assets to predict maintenance requirements for each of the set of physical assets. The maintenance analysis tool further comprises an output component configured to: generate a maintenance plan based on the predicted maintenance requirements for each of the set of physical assets.

In a third approach, there is a computer program product for infrastructure asset management, the computer program product comprising a computer readable storage media, and program instructions stored on the computer readable storage media to: receive data about a set of physical assets of an infrastructure; analyze the data about the set of physical assets to predict maintenance requirements for each of the set of physical assets; and generate a maintenance plan based on the predicted maintenance requirements for each of the set of physical assets.

In a fourth approach, there is a method for infrastructure asset management, comprising: providing a maintenance analysis tool within a computing infrastructure having functionality to: receive data about a set of physical assets of an infrastructure; analyze the data about the set of physical assets to predict maintenance requirements for each of the set of physical assets; and generate a maintenance plan based on the predicted maintenance requirements for each of the set of physical assets.

Figure 1:
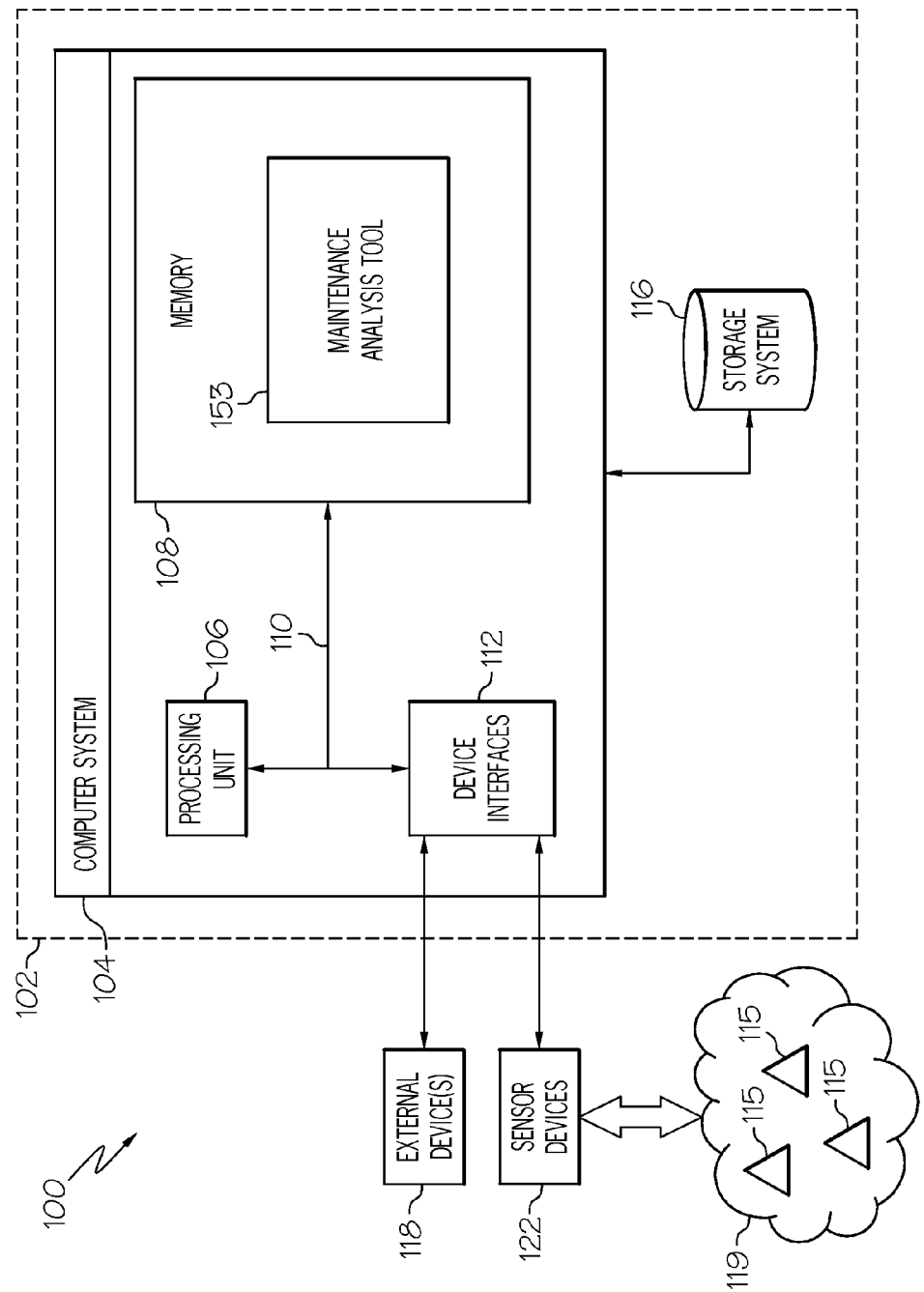
FIG. 1 shows a schematic of an exemplary computing environment in which elements of the present invention may operate.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of this invention are directed to infrastructure asset maintenance management. This approach comprises an end-to-end solution that can take data about physical assets (e.g., maintenance records, usage records) and additional external data (e.g., weather, demographics), and apply advanced analytics to the data to generate business insight, foresight and planning information. Specifically, this approach uses a maintenance analysis tool to improve work management, reduce down time through preventive maintenance, and provide effective demand management. In one embodiment, the maintenance analysis tool is configured to: receive data about a set of physical assets of an infrastructure; and analyze the data about the set of physical assets to predict maintenance requirements for each of the set of physical assets. The maintenance analysis tool further comprises an output component configured to: generate a maintenance plan based on the predicted maintenance requirements for each of the set of physical assets.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for infrastructure asset management. It should be understood that any other computers implemented under the present invention may have different components/software, but will perform similar functions. As shown, computer system 104 includes a processing unit 106 capable of receiving data regarding a set of physical assets 115 of an infrastructure 119, and sending the data to a maintenance analysis tool 153. Also shown is memory 108 for storing maintenance analysis tool 153, a bus 110, and device interfaces 112.

Figure 2:
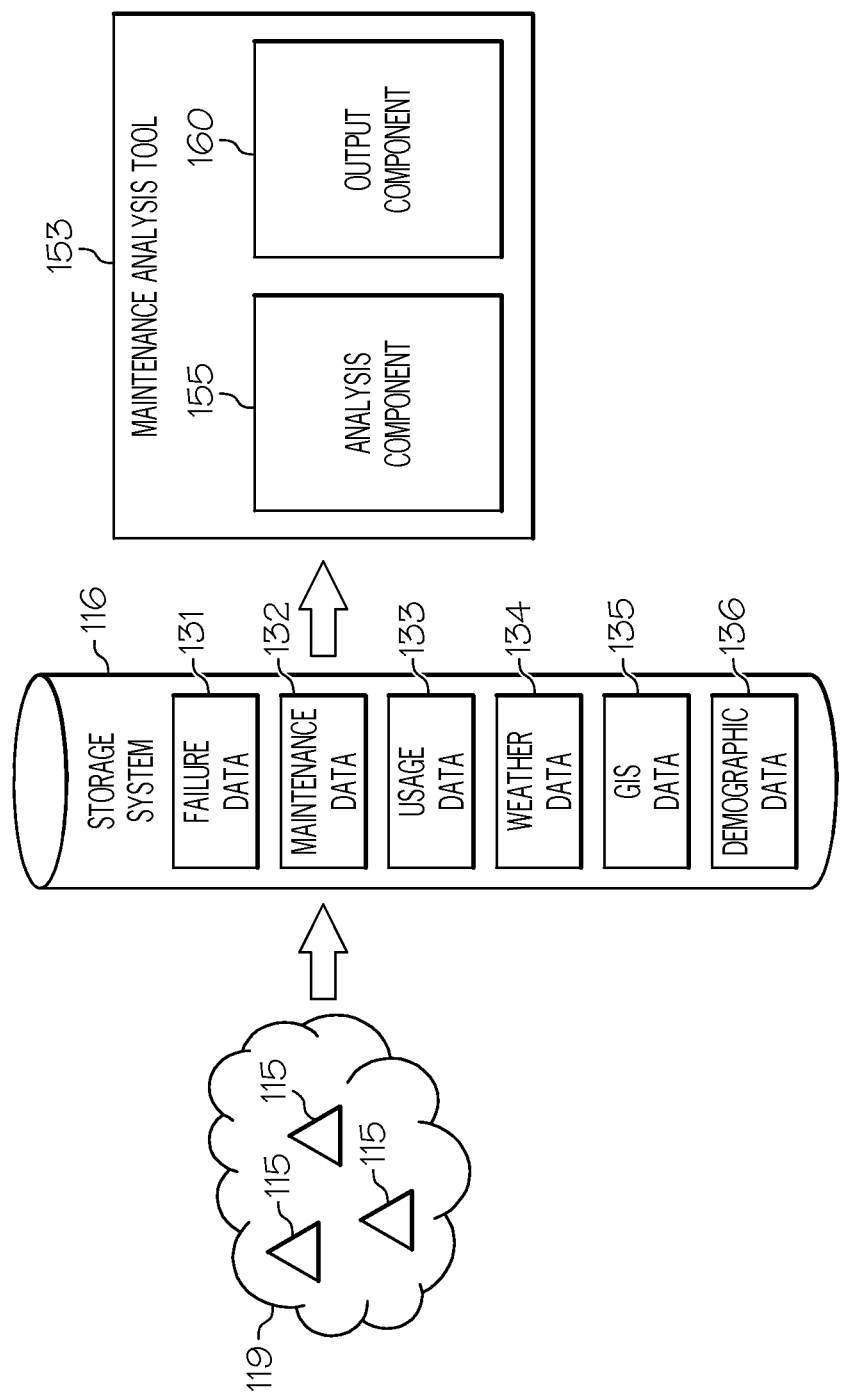
FIG. 2 shows a maintenance analysis tool that operates in the environment shown in FIG. 1.

Computer system 104 is shown communicating with a set (i.e., one or more) of sensor devices 122 that communicate with bus 110 via device interfaces 112. As shown in FIG. 2, sensor devices 122 monitor and receive data from infrastructure 119. In one embodiment, as will be further described below, infrastructure 119 may include all the components of a large water and sewer authority. However, it'll be appreciated that in other embodiments, infrastructure 119 may comprise power utilities, transportation operators, hotels, oil and gas companies, power plants, etc. Sensor devices 122 include one or more sensor devices for capturing data regarding physical assets 115 (e.g., metering units, pipes, fire hydrants, drainage units, etc.) within infrastructure 119. Sensor device 122 can include virtually any type of sensor capable of capturing information and attributes of assets 115 with sufficient quality to support the methods of the invention as described herein.

Processing unit 106 (FIG. 1) collects and routes signals representing outputs from sensor devices 122 to maintenance analysis tool 153. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the data signals may be encrypted using, for example, trusted key-pair encryption. Different sensor systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating maintenance analysis tool 153, which is stored in memory 108 and/or storage system 116. While executing computer program code, processing unit 106 can read and/or write data to/from memory 108 and storage system 116. In one embodiment, as shown in FIG. 2, storage system 116 contains information about set of physical assets 115, including failure data 131, maintenance data 132, usage data 133, weather data 134, graphical information system (GIS) data 135, and demographic data 136. Storage system 116 can include VCRs, DVRs, RAID arrays, USB hard drives, optical disk recorders, flash storage devices, image analysis devices, general purpose computers, video enhancement devices, de-interlacers, scalers, and/or other visual or data processing and storage elements for storing and/or processing data regarding set of physical assets 115 of infrastructure 119.

Although not shown, computer system 104 could also include I/O interfaces that communicate with one or more external devices 118 that enable a user to interact with computer system 104 (e.g., a keyboard, a pointing device, a display, etc.). In one embodiment, an output is generated by maintenance analysis tool 153 to prioritize the dispatch of preventive maintenance personnel. The output may display key performance indicators of infrastructure 119, including but not limited to: comprehensive query and reporting, dashboarding/reporting, score carding, temporal analysis reporting, spatial analysis reporting, and mapping displays to help you understand and visualize data.

Figure 3:
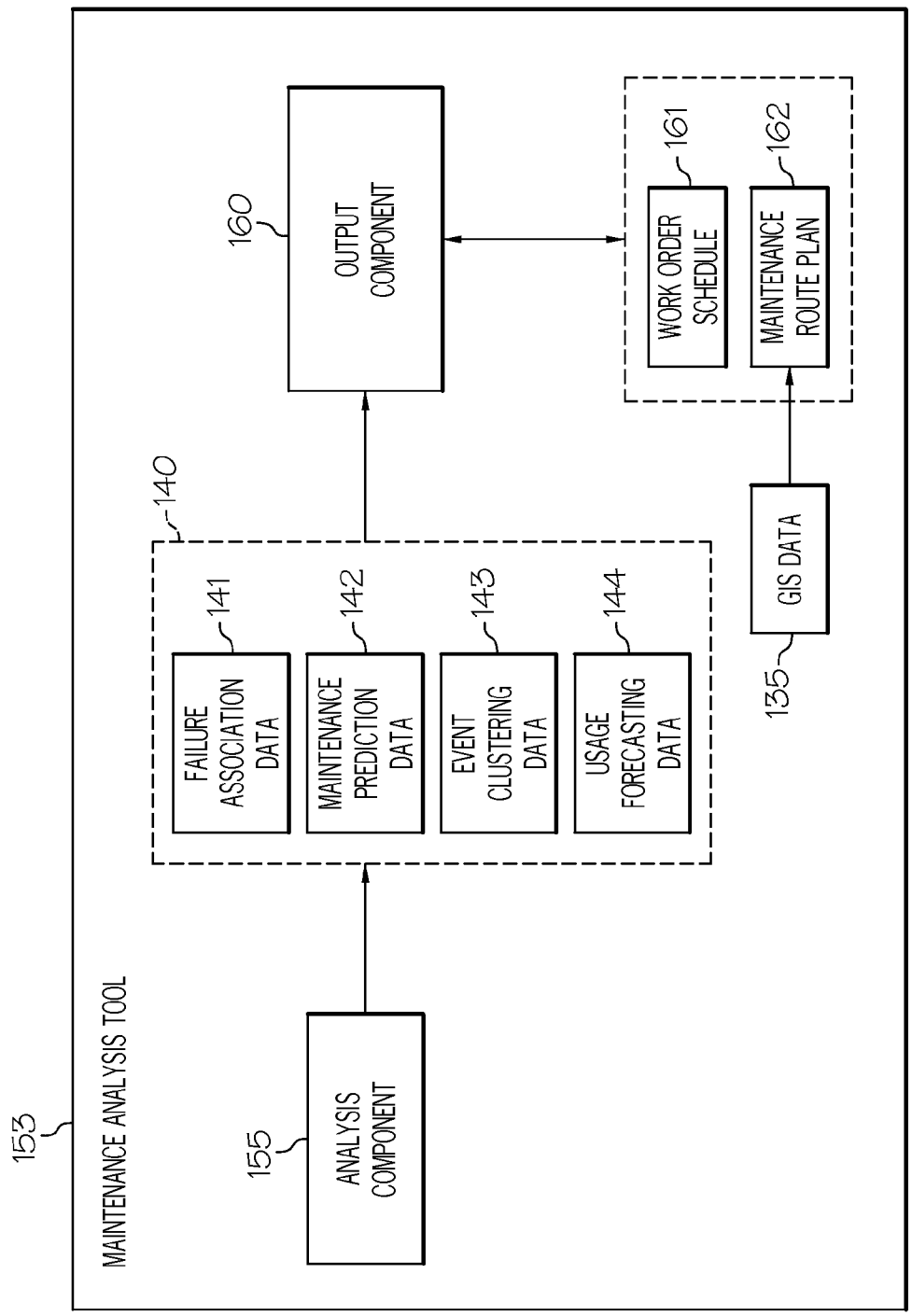
FIG. 3 shows a more detailed view of the maintenance analysis tool according to embodiments of the invention.

Referring now to FIGS. 2-3 maintenance analysis tool 153 will be described in greater detail. As discussed above, maintenance analysis tool 153 provides an end-to-end, analytics driven approach for asset maintenance management. Maintenance analysis tool 153 explores large complex data sets from disparate sources, performs complex analysis of an event or action to improve maintenance performance, and provides data relationships graphically/visually to aid in comprehension and implementation. To accomplish this, maintenance analysis tool 153 comprises an analysis component 155 configured to receive data about set of physical assets 115 of infrastructure 119. Specifically, analysis component 155 receives data from sensor devices 122, as well as data about physical assets 115 gathered from other sources and stored within storage system 116. In this embodiment, analysis component receives failure data 131, maintenance data 132, usage data 133, weather data 134, graphical information system (GIS) data 135, and demographic data 136.

In one non-limiting example, data regarding a set of fire hydrants within infrastructure 119 is collected and sent to analysis component 155. This data may comprise location data, demographic data, past work order history, usage data, hydrant manufacturer data, weather data, etc. Analysis component 155 is configured to analyze the data about set of physical assets 115 to predict maintenance requirements for each of set of physical assets 115. To accomplish this, in one embodiment, analysis component 155 performs at least one of the following analytics: predictive modeling (e.g., predictive analytics and data mining), optimization (e.g., failure-risk optimization), and spatio-temporal analysis. It will be appreciated that many types and combinations of advanced analytics are possible within the scope of the invention for the purpose of gaining insights, foresights and prescribing actions in support of improved infrastructure maintenance. For example, maintenance analysis tool 153 may provide analysis of the data using one or more of the following: customer and usage analytics (e.g., customer segmentation, usage anomaly detection, usage forecasting, etc.), work management analytics (e.g., spatio-temporal manual scheduling, automated spatial scheduling, automated task level rolling scheduling, dynamic mobile work management, etc.), predictive maintenance analytics (e.g., large scale failure association analysis, asset life time analysis for preventive maintenance optimization, strategic replacement planning, risk estimation and failure prediction, etc.), and space-time analytics (e.g., spatio-temporal pattern detection, user defined alerting, spatio-temporal visualization, multi-dimensional visualization, etc.).

Analysis component 155 performs advanced analytics to produce information 140 regarding the assets 115, as shown in FIG. 3. In this embodiment, analysis component 155 generates failure association data 141, maintenance prediction data 142, event clustering data 143, and usage forecasting data 144. For example, failure association data 141 and event clustering data 143 may comprise data about the failure rates and locations of fire hydrants within infrastructure 119. In this example, analysis component 155 performs a failure association analysis, which examines large volumes of data to discover fire hydrant failure correlations. The failure association analysis may discover, for example, that fire hydrants from manufacturer 'X' fail more often than fire hydrants from manufacturer 'Y' when the average temperature is between 75 and 91 degrees Fahrenheit. Or, the analysis discovers a higher rate of failure clustered in certain geographic area. As such, a city having an average temperature in that range may wish to purchase fire hydrants from manufacturer 'Y' in the future, or modify the preventive maintenance routes and schedules accordingly.

As shown in FIG. 3, information 140 is sent to an output component 160 configured to generate a maintenance plan based on the predictive maintenance requirements for each of the set of physical assets 115, as well as the infrastructure as a whole. In one embodiment, output component 160 is configured to create at least one of the following: a work order schedule 161, and a maintenance route plan 162. For example, based on the failure association data 141 that determined that fire hydrants from manufacturer 'X' fail more often than fire hydrants from manufacturer 'Y' when the average temperature is between 75 and 91 degrees Fahrenheit, output component 160 may generate an automated scheduling and maintenance plan, as well as an automated routing plan to provide location based dynamic work assignments for maintenance personnel with respect to fire hydrants from manufacturer 'X'.

Furthermore, as shown in FIG. 3, maintenance route plan 162 may be combined with GIS data 135 to provide location information about physical assets 115. GIS data 135 is commonly presented in the form of a visual map, which provides "layers" of information. GIS maps combine layers of information about a given asset or location, thereby providing an infrastructure operator with a better understanding of specific locations in infrastructure 119. GIS data 135 may be represented as a visual overlay, which provides information about the location of objects such as fire hydrants from manufacturer 'X', for example. Output component 160 is configured to apply GIS data 135 to visual media to determine and display street address information, thereby presenting a detailed view of the location of infrastructure objects.

It can be appreciated that the methodologies disclosed herein can be used within a computer system for infrastructure asset management, as shown in FIG. 1. In this case, maintenance analysis tool 153 can be provided, and one or more systems for performing the processes described in the invention can be obtained and deployed to computer infrastructure 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 4:
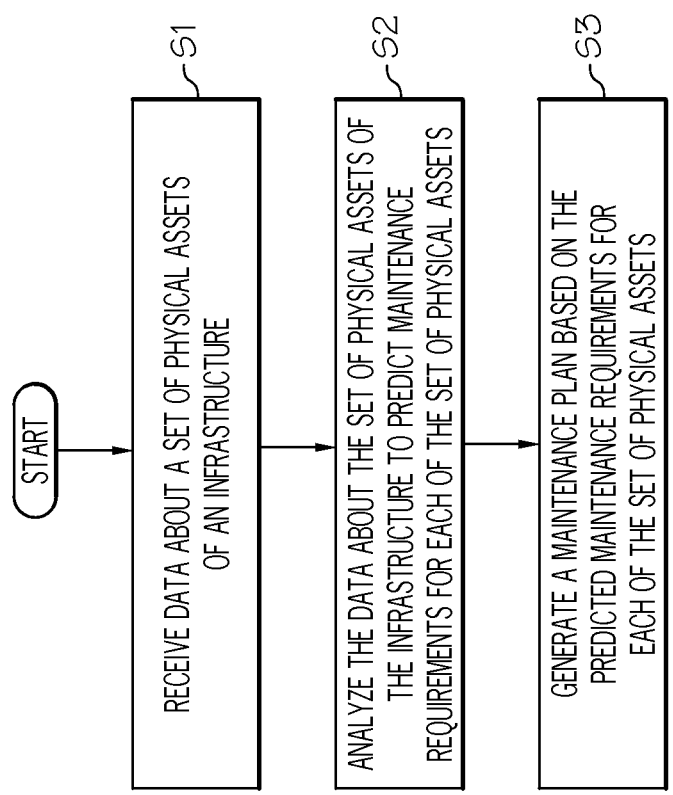
FIG. 4 shows a flow diagram of an approach for infrastructure asset management according to embodiments of the invention.

The program modules carry out the methodologies disclosed herein, as shown in FIG. 4. According to one embodiment, at S1 data about a set of physical asset of an infrastructure is received. At S2, the data about the physical assets is analyzed to predict maintenance requirements for each of the set of physical assets. At S3, a maintenance plan is generated based on the predicted maintenance requirements for each of the set of physical assets.

The flowchart of FIG. 4 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Furthermore, an implementation of exemplary computer system 104 (FIG. 1) may be stored on or transmitted across some form of computer readable storage medium. Computer readable storage medium can be any available media that can be accessed by a computer. By way of example, and not limitation, computer readable storage medium may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data. Communication media also includes any information delivery media.

It is apparent that there has been provided with this invention an approach for infrastructure asset management. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for infrastructure asset management, comprising the computer-implemented steps of:
   providing a set of sensor devices for capturing data about a set of physical assets of an infrastructure;
   capturing the data about the set of physical assets;
   encrypting the data about the set of physical assets;
   receiving, over a network from the set of sensor devices, the data about the set of physical assets as encrypted data, the data comprising external data including environmental weather data and demographics data for each of the set of physical assets, the network comprising at least one of a local area network, a wide area network, a broadband network, or a wireless network;
   routing the data received from the set of sensor devices to a maintenance analysis tool comprising specifically configured hardware and software components of a computerized infrastructure asset management system, the routing via at least one of Ethernet, wireless network, direct serial connection, parallel connection, USB, and short-distance wireless systems;
   correlating, by the maintenance analysis tool, historical data, retrieved from a storage system, comprising a manufacturer of each of the set of physical assets, a geographic location of each of the set of physical assets, and at least one weather condition that previously necessitated maintenance for each of the set of physical assets, wherein the storage system comprises at least one of the group: VCRs, DVRs, RAID arrays, USB hard drives, optical disk recorders, flash storage devices, image analysis devices, video enhancement devices, de-interlacers, and scalers;
   analyzing, by the maintenance analysis tool, the data about the set of physical assets, the historical data, and graphical information system (GIS) data about the set of physical assets to predict maintenance requirements for each of the set of physical assets arising from an anticipated weather condition similar to the at least one weather condition;
   identifying by the maintenance analysis tool, based on the analyzing, a subset of the set of physical assets, the subset being clustered within a portion of the geographic location, the subset comprising a higher rate of previously necessitated maintenance during the at least one weather condition, as compared to other physical assets within the set, and
   generating, by the maintenance analysis tool, a maintenance plan for the subset of the set of physical assets based on the analyzing and the identifying,
   wherein the GIS data comprises location information about each of the set of physical assets represented by one or more layers displayed on a visual map.

2. The method according to claim 1, the data about the set of physical assets further comprising at least one of the following: failure data, maintenance data, usage data, and graphical information system (GIS) data.

3. The method according to claim 1, the computer-implemented step of analyzing comprising at least one of the following analytics: predictive modeling, optimization, and spatio-temporal analysis.

4. The method according to claim 1, wherein the analyzing further comprises the computer-implemented step of generating information about the set of physical assets, the information comprising at least one of the following: failure association, maintenance prediction, event clustering, and usage forecasting.

5. The method according to claim 1, the generating comprising the computer-implemented step of creating at least one of the following: a work order schedule, and a maintenance route plan.

6. A system for infrastructure asset management comprising:
   a set of sensor devices in communication with a bus of a computer system;
   at least one processing unit;
   memory operably associated with the at least one processing unit;
   the bus; and
   a maintenance analysis tool storable in memory and executable by the at least one processing unit, the maintenance analysis tool comprising:
   an analysis component configured to:
   capture data about a set of physical assets from a set of sensor devices;
   encrypt the data about the set of physical assets;
   receive, over a network from the set of sensor devices, the data about the set of physical assets as encrypted data, the data comprising external data including environmental weather data and demographics data for each of the set of physical assets, the network comprising at least one of a local area network, a wide area network, a broadband network, or a wireless network;
   route the data received from the set of sensor devices to a maintenance analysis tool comprising specifically configured hardware and software components of a computerized infrastructure asset management system, the routing via at least one of Ethernet, wireless network, direct serial connection, parallel connection, USB, and short-distance wireless systems;
   correlate, by the maintenance analysis tool, historical data, retrieved from a storage system, comprising a manufacturer of each of the set of physical assets, a geographic location of each of the set of physical assets, and at least one weather condition that previously necessitated maintenance for each of the set of physical assets, wherein the storage system comprises at least one of the group: VCRs, DVRs, RAID arrays, USB hard drives, optical disk recorders, flash storage devices, image analysis devices, video enhancement devices, de-interlacers, and scalers;
   analyze, by the maintenance analysis tool, the data about the set of physical assets, the historical data, and graphical information system (GIS) data about the set of physical assets to predict maintenance requirements for each of the set of physical assets arising from an anticipated weather condition similar to the at least one weather condition;
identify, by the maintenance analysis tool, based on the analyzing, a subset of the set of physical assets, the subset being clustered within a portion of the geographic location, the subset comprising a higher rate of previously necessitated maintenance during the at least one weather condition, as compared to other physical assets within the set, and an output component configured to:
generate, by the maintenance analysis tool, a maintenance plan for the subset of the set of physical assets to reduce the probability of failures within the geographic location, based on the analyzing and the identifying,
wherein the GIS data comprises location information about each of the set of physical assets represented by one or more layers displayed on a visual map.

7. The maintenance analysis tool according to claim 6, the data about the set of physical assets further comprising at least one of the following: failure data, maintenance data, usage data, and graphical information system (GIS) data.

8. The maintenance analysis tool according to claim 6, the analysis component configured to perform at least one of the following analytics: predictive modeling, optimization, and spatio-temporal analysis.

9. The maintenance analysis tool according to claim 6, the analysis component configured to generate information about the set of physical assets, the information comprising at least one of the following: failure association, maintenance prediction, event clustering, and usage forecasting.

10. The maintenance analysis tool according to claim 6, the output component configured to create at least one of the following: a work order schedule, and a maintenance route plan.

11. A system comprising:
a set of sensor devices in communication with a bus of a computer; and
a computer program product for infrastructure asset management, the computer program product comprising a non-transitory computer readable storage medium, and program instructions stored on the computer readable storage medium, which when executed by a processor cause the computer to:
capture data about a set of physical assets from the set of sensor devices;
encrypt the data about the set of physical assets;
receive, over a network from the set of sensor devices, the data about the set of physical assets as encrypted data, the data comprising external data including environmental weather data and demographics data for each of the set of physical assets, the network comprising at least one of a local area network, a wide area network, a broadband network, or a wireless network;
route the data received from the set of sensor devices to a maintenance analysis tool comprising specifically configured hardware and software components of a computerized infrastructure asset management system, the routing via at least one of Ethernet, wireless network, direct serial connection, parallel connection, USB, and short-distance wireless systems;
correlate, by the maintenance analysis tool, historical data, retrieved from a storage system, comprising a manufacturer of each of the set of physical assets, a geographic location of each of the set of physical assets, and at least one weather condition that previously necessitated maintenance for each of the set of physical assets, wherein the storage system comprises at least one of the group: VCRs, DVRs, RAID arrays, USB hard drives, optical disk recorders, flash storage devices, image analysis devices, video enhancement devices, de-interlacers, and scalers;
analyze, by the maintenance analysis tool, the data about the set of physical assets, the historical data, and graphical information system (GIS) data about the set of physical assets to predict maintenance requirements for each of the set of physical assets arising from an anticipated weather condition similar to the at least one weather condition;
associate, by the maintenance analysis tool, the failures with a portion of the geographic location during at least one weather condition;
identifying, by the maintenance analysis tool, based on the analyzing, a subset of the set of physical assets, the subset being clustered within the portion of the geographic location, the subset comprising a higher rate of previously necessitated maintenance during the at least one weather condition, as compared to other physical assets within the set, detect failures of a subset of the set of physical assets; and
generate a maintenance plan for the subset of the set of physical assets based on the identifying,
wherein the GIS data comprises location information about each of the set of physical assets represented by one or more layers displayed on a visual map.

12. The computer program product of claim 11, the data about the set of physical assets further comprising at least one of the following: failure data, maintenance data, usage data, and graphical information system (GIS) data.

13. The computer program product of claim 11, further comprising program instructions stored on the non-transitory computer readable storage medium to perform at least one of the following analytics: predictive modeling, optimization, and spatio-temporal analysis.

14. The computer program product of claim 11, further comprising program instructions stored on the non-transitory computer readable storage medium to generate information about the set of physical assets, the information comprising at least one of the following: failure association, maintenance prediction, event clustering, and usage forecasting.

15. The computer program product of claim 11, further comprising program instructions stored on the non-transitory computer readable storage medium to create at least one of the following: a work order schedule, and a maintenance route plan.

16. A method for infrastructure asset management, the method comprising:
providing a set of sensor devices for capturing data about a set of physical assets of an infrastructure;
capturing the data about the set of physical assets;
encrypting the data about the set of physical assets;
receiving, over a network from the set of sensor devices, the data about the set of physical assets as encrypted data, the data comprising external data including environmental weather data and demographics data for each of the set of physical assets, the network comprising at least one of a local area network, a wide area network, a broadband network, or a wireless network;
routing the data received from the set of sensor devices to a maintenance analysis tool comprising specifically configured hardware and software components of a computerized infrastructure asset management system, the routing via at least one of Ethernet, wireless network, direct serial connection, parallel connection, USB, and short-distance wireless systems;

correlating, by the maintenance analysis tool, historical data, retrieved from a storage system, comprising a manufacturer of each of the set of physical assets, a geographic location of each of the set of physical assets, and at least one weather condition that previously necessitated maintenance for each of the set of physical assets, wherein the storage system comprises at least one of the group: VCRs, DVRs, RAID arrays, USB hard drives, optical disk recorders, flash storage devices, image analysis devices, video enhancement devices, de-interlacers, and scalers;

analyzing, by the maintenance analysis tool, the data about the set of physical assets, the historical data, and graphical information system (GIS) data about the set of physical assets to predict maintenance requirements for each of the set of physical assets arising from an anticipated weather condition similar to the at least one weather condition;

detecting, by the maintenance analysis tool, failures of a subset of the set of physical assets;

associating, by the maintenance analysis tool, the failures with a portion of the geographic location during the at least one weather condition;

identifying, based on the analyzing, a subset of the set of physical assets, the subset being clustered within a portion of the geographic location, the subset comprising a higher rate of previously necessitated maintenance during the at least one weather condition, as compared to other physical assets within the set; and generating, by the computer system, a maintenance plan based on the identifying, wherein the GIS data comprises location information about each of the set of physical assets represented by one or more layers displayed on a visual map.

17. The method of claim 16, the data about the set of physical assets further comprising at least one of the following: failure data, maintenance data, usage data, and graphical information system (GIS) data.

18. The method of claim 16, the analyzing further comprising performing, by the computer system, at least one of the following analytics: predictive modeling, optimization, and spatio-temporal analysis.

19. The method of claim 16, the analyzing further comprising generating, by the computer system, information about the set of physical assets, the information comprising at least one of the following: failure association, maintenance prediction, event clustering, and usage forecasting.

20. The method of claim 16, further comprising creating, by the computer system, at least one of the following: a work order schedule, and a maintenance route plan.

* * * * *